US011771262B2

(12) United States Patent
Williams et al.

(10) Patent No.: US 11,771,262 B2
(45) Date of Patent: *Oct. 3, 2023

(54) COLLAPSIBLE GRILL

(71) Applicant: Home Depot Product Authority, LLC, Atlanta, GA (US)

(72) Inventors: Dan Williams, Arlington Heights, IL (US); Riley Wong, Arlington Heights, IL (US); Jason Carley, Arlington Heights, IL (US); Steve Oshgan, Arlington Heights, IL (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,657

(22) Filed: Aug. 2, 2022

(65) Prior Publication Data
US 2023/0018943 A1    Jan. 19, 2023

Related U.S. Application Data

(63) Continuation of application No. 16/831,299, filed on Mar. 26, 2020, now Pat. No. 11,399,659.

(51) Int. Cl.
*F24C 1/16* (2021.01)
*A47J 37/07* (2006.01)
*F24C 15/08* (2006.01)

(52) U.S. Cl.
CPC ............ *A47J 37/0704* (2013.01); *F24C 1/16* (2013.01); *F24C 15/086* (2013.01); *A47J 2037/0777* (2013.01)

(58) Field of Classification Search
CPC ....... F24C 15/086; F24C 1/16; A47J 37/0786; A47J 37/0704; A47J 2037/0777
See application file for complete search history.

(56) References Cited

U.S. PATENT DOCUMENTS

| D188,879 S | 9/1960 | Gauss et al. |
| 3,297,016 A | 1/1967 | Rhodes et al. |

(Continued)

FOREIGN PATENT DOCUMENTS

| CN | 203676893 | 7/2014 |
| CN | 204889720 | 12/2015 |

(Continued)

OTHER PUBLICATIONS

U.S. Patent and Trademark Office, Non-Final Office Action issued in U.S. Appl. No. 29/729,433, dated Nov. 19, 2021, 12 pgs.

(Continued)

*Primary Examiner* — Alfred Basichas
(74) *Attorney, Agent, or Firm* — Greenberg Traurig, LLP

(57) ABSTRACT

An embodiment of a support assembly for a grill may include a leg subassembly comprising a first leg and a second leg, a leg subassembly comprising a first leg and a second leg, the first leg defining a retaining aperture, and a rotatable pin collar assembly configured to couple the first leg to the second leg in a slidable and lockable connection, the rotatable pin collar assembly including a spring pin configured to be retained in the retaining aperture at a first longitudinal position on the first leg when the grill is in a standing locked configuration and configured to be positioned at a second longitudinal position on the first leg when the grill is in a collapsed configuration.

20 Claims, 16 Drawing Sheets

(56) References Cited

U.S. PATENT DOCUMENTS

| | | | |
|---|---|---|---|
| 4,045,045 A | 8/1977 | Boucher et al. | |
| 4,210,118 A | 7/1980 | Davis et al. | |
| 4,245,850 A | 1/1981 | Boudreau | |
| D315,079 S | 3/1991 | Jui-Yen | |
| 5,163,414 A | 11/1992 | Haynes, Jr. | |
| 6,422,230 B1 | 7/2002 | Stewart et al. | |
| D480,906 S | 10/2003 | Pai | |
| D480,907 S | 10/2003 | Pai | |
| 6,837,503 B2 | 1/2005 | Chen et al. | |
| 6,951,213 B2 | 10/2005 | Coleman et al. | |
| D516,860 S | 3/2006 | Nipke | |
| D623,004 S | 9/2010 | Groth | |
| 8,316,837 B2 | 11/2012 | Malumyan | |
| D680,364 S | 4/2013 | Chung | |
| D680,796 S | 4/2013 | Chung | |
| D718,088 S | 11/2014 | Chung | |
| 9,096,247 B2 | 8/2015 | Witzel et al. | |
| 9,187,108 B2 | 11/2015 | Bruno | |
| 9,226,614 B2 | 1/2016 | Lin | |
| D792,148 S | 7/2017 | Chung | |
| D865,503 S | 11/2019 | Zhuang | |
| D875,468 S | 2/2020 | Chung | |
| D920,044 S | 5/2021 | Chung | |
| 11,399,659 B2 * | 8/2022 | Williams | A47J 37/0786 |
| 2004/0182381 A1 | 9/2004 | Yeh | |
| 2005/0252504 A1 | 11/2005 | Cabrera et al. | |
| 2006/0130825 A1 | 6/2006 | Yeh | |
| 2007/0084354 A1 | 4/2007 | Ming | |
| 2007/0290486 A1 | 12/2007 | Chung | |
| 2010/0326417 A1 | 12/2010 | Groth et al. | |
| 2011/0094494 A1 | 4/2011 | Malumyan | |
| 2011/0214662 A1 | 9/2011 | Contarino, Jr. | |
| 2011/0271949 A1 | 11/2011 | Ortner et al. | |
| 2012/0174907 A1 | 7/2012 | Yeh | |
| 2013/0206015 A1 | 8/2013 | Jacoby et al. | |
| 2014/0165993 A1 | 6/2014 | Ahmed | |
| 2014/0265186 A1 | 9/2014 | Witzel et al. | |
| 2015/0251678 A1 | 9/2015 | Bruno et al. | |
| 2016/0106252 A1 | 4/2016 | Baker | |
| 2016/0213198 A1 | 7/2016 | Smith | |
| 2017/0321461 A1 | 11/2017 | Chung | |
| 2021/0038022 A1 | 2/2021 | Gippert | |
| 2021/0215342 A1 | 7/2021 | Hunt et al. | |
| 2021/0298524 A1 | 9/2021 | Williams et al. | |

FOREIGN PATENT DOCUMENTS

| | | |
|---|---|---|
| EM | 000903422-0001 | 4/2008 |
| EM | 007974985-0014 | 6/2020 |
| EM | 008034607-0001 | 7/2020 |
| GB | 2476951 | 7/2011 |

OTHER PUBLICATIONS

Americana Walk-A-Bout [online] URL: https://www.homedepot.com/p/Americana-Walk-A-Bout-Portable-Charcoal-Grill-4200-0A236/100164850 (site visited: Nov. 1, 2021) (Year:2013).

PLTX [online] URL: https://www.pkgrills.com/the-original-pktx-grill-smoker-classic-silver/ (site visited: Nov. 10, 2021) (Year: 2019).

Dyna-Glo [online] URL:https://www.homedepot.com/p/Dyna-Glo-Portable-Charcoal-Grill-in-Black-DGC313CNCP/314037224# overlay (site visited:Nov. 10, 2021) (Year: 2020).

"Weber 6557 q portable cart for grilling," available at https://www.amazon.com/Weber-6557-Portable-CartGrilling/dp/B00FLRB0GK/ref=pd_lpo_vtph_86_bs_tr_img_1?_encoding=UTF8&&psc=1&refRID=PCCAVM3WYXYCKFCBRVH5 Published/Accessed: Jan. 24, 2018.

* cited by examiner

COLLAPSIBLE GRILL

FIELD OF THE DISCLOSURE

The instant disclosure relates to a grill, including a grill having a collapsible support assembly.

BACKGROUND

Grills are generally known to include a grill body and a support assembly. The grill body may include a grill chamber for cooking food, and the support assembly may include one or more structures for supporting the grill body for operative use.

SUMMARY

An embodiment of a support assembly for a grill may include a leg subassembly comprising a first leg and a second leg, a leg subassembly comprising a first leg and a second leg, the first leg defining a retaining aperture, and a rotatable pin collar assembly configured to couple the first leg to the second leg in a slidable and lockable connection, the rotatable pin collar assembly including a spring pin configured to be retained in the retaining aperture at a first longitudinal position on the first leg when the grill is in a standing locked configuration and configured to be positioned at a second longitudinal position on the first leg when the grill is in a collapsed configuration.

In an embodiment, the rotatable pin collar assembly may further include a housing defining a longitudinal aperture through which the first leg extends and a transverse aperture through which the spring pin extends, and a handle, coupled to the spring pin, whereby actuation of the handle causes retraction and extension of the spring pin.

In an embodiment, the housing may be configured to permit the first leg to move longitudinally through the longitudinal aperture.

In an embodiment, the housing may be rotatably coupled to the second leg.

In an embodiment, the housing may be configured to rotate with respect to the second leg about a pin collar rotation axis, the pin collar rotation axis generally parallel with the transverse aperture.

In an embodiment, the housing may have the same longitudinal position with respect to the length of the second leg in the standing locked position and in the collapsed locked position.

In an embodiment, the first and second legs may cross each other in the standing position, and the first and second legs are substantially parallel to each other in the collapsed position.

In an embodiment, the first leg may include an outer portion and an inner portion disposed within the outer portion, and the inner portion and the outer portion may be configured to translate longitudinally with respect to one another.

In an embodiment, the support assembly may further include a snap button coupled to one of the inner portion or the outer portion, wherein the other of the inner portion or the outer portion may define a snap button aperture configured to receive the snap pin to secure the longitudinal position of the inner portion with respect to the outer portion.

In an embodiment, the leg subassembly may be a first leg subassembly and the rotatable pin collar may be a first rotatable pin collar, and the support assembly may further include a second leg subassembly comprising a third leg and a fourth leg and a second rotatable pin collar assembly configured to attach the third leg to the fourth leg in a slidable connection.

In an embodiment, the second rotatable pin collar assembly may include a housing defining a longitudinal aperture through which the third leg extends, wherein the housing is configured to permit the third leg to move longitudinally through the longitudinal aperture.

In an embodiment, the housing of the second rotatable pin collar assembly may be rotatably coupled to the fourth leg.

In an embodiment, the housing may have the same longitudinal position with respect to the length of the fourth leg in the standing locked position and in the collapsed locked position.

In an embodiment, the third and fourth legs may cross each other in the standing configuration, and the third and fourth legs may be substantially parallel to each other in the collapsed configuration.

In an embodiment, the third leg includes an outer portion, and an inner portion disposed within the outer portion, wherein the inner portion and the outer portion are configured to translate longitudinally with respect to one another.

An embodiment of a grill may include a body defining a grill chamber, and a support assembly coupled to the body. The support assembly may include a leg subassembly comprising a first leg and a second leg, the first leg defining a retaining aperture. The support assembly may further include a rotatable pin collar assembly configured to attach the first leg to the second leg in a slidable and lockable connection, the rotatable pin collar including a spring pin configured to be retained in the retaining aperture at a first longitudinal position on the first leg when the grill is in a standing locked configuration and configured to be positioned at a second longitudinal position on the first leg when the grill is in a collapsed configuration.

In an embodiment, a first longitudinal end of the first leg may be rotatably coupled to the body and a first longitudinal end of the second leg is rotatably coupled to the body, and the rotatable pin collar may further include a housing defining a longitudinal aperture through which the first leg extends and a transverse aperture through which the spring pin extends, and a handle, coupled to the spring pin whereby actuation of the handle causes retraction and extension of the spring pin.

In an embodiment, the housing may be configured to permit the first leg to move longitudinally through the longitudinal aperture.

In an embodiment, the housing may be rotatably coupled to the second leg.

In an embodiment, the housing may be configured to rotate with respect to the second leg about a pin collar rotation axis, the pin-collar rotation axis generally parallel with the transverse aperture, and the first leg and second leg may be configured to rotate with respect to the body about respective body rotation axes that are generally parallel with the pin collar rotation axis.

DETAILED DESCRIPTION

Figure 1:
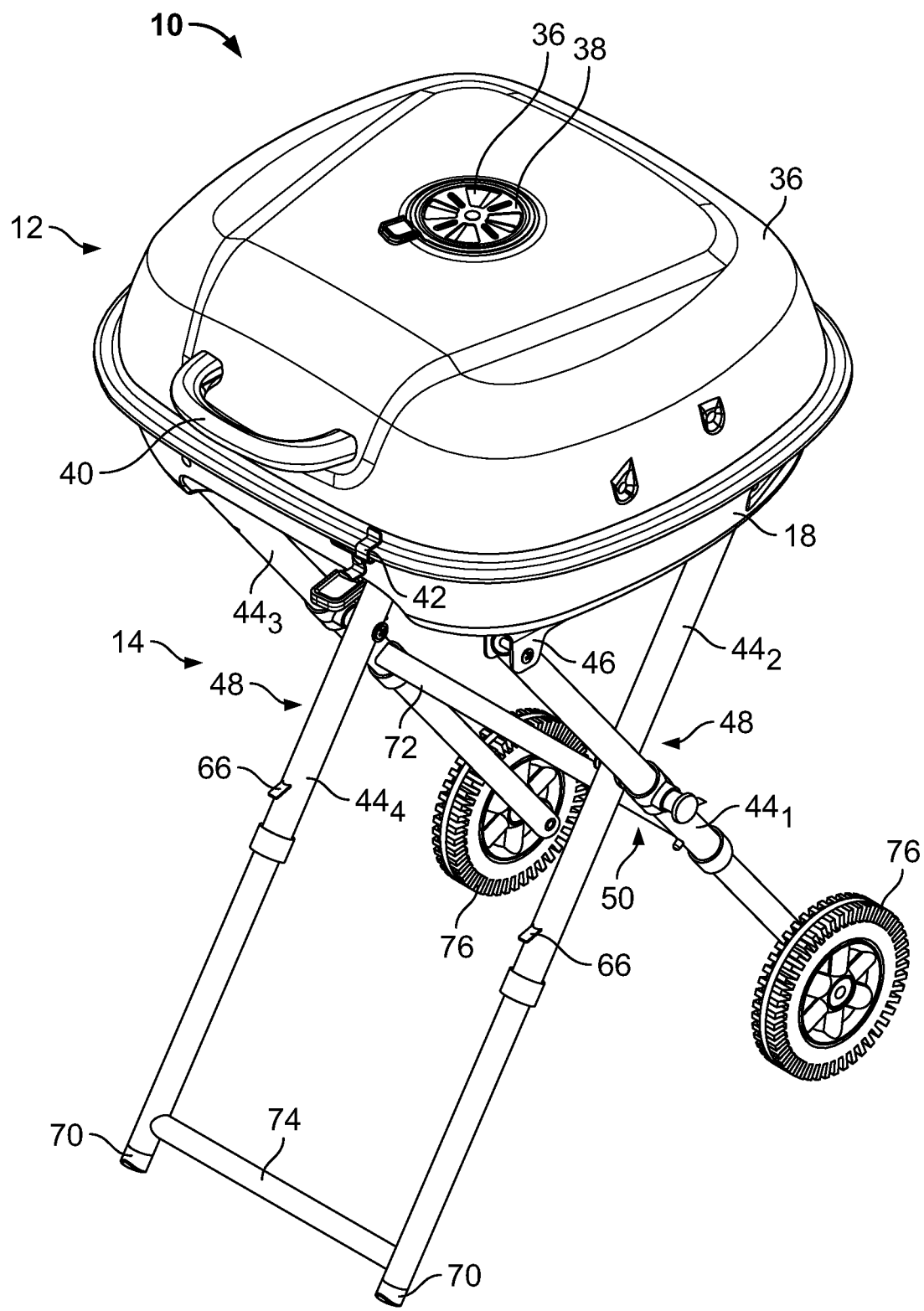
FIG. 1 is a perspective view of an example embodiment of a grill in an example expanded configuration.
Figure 2:
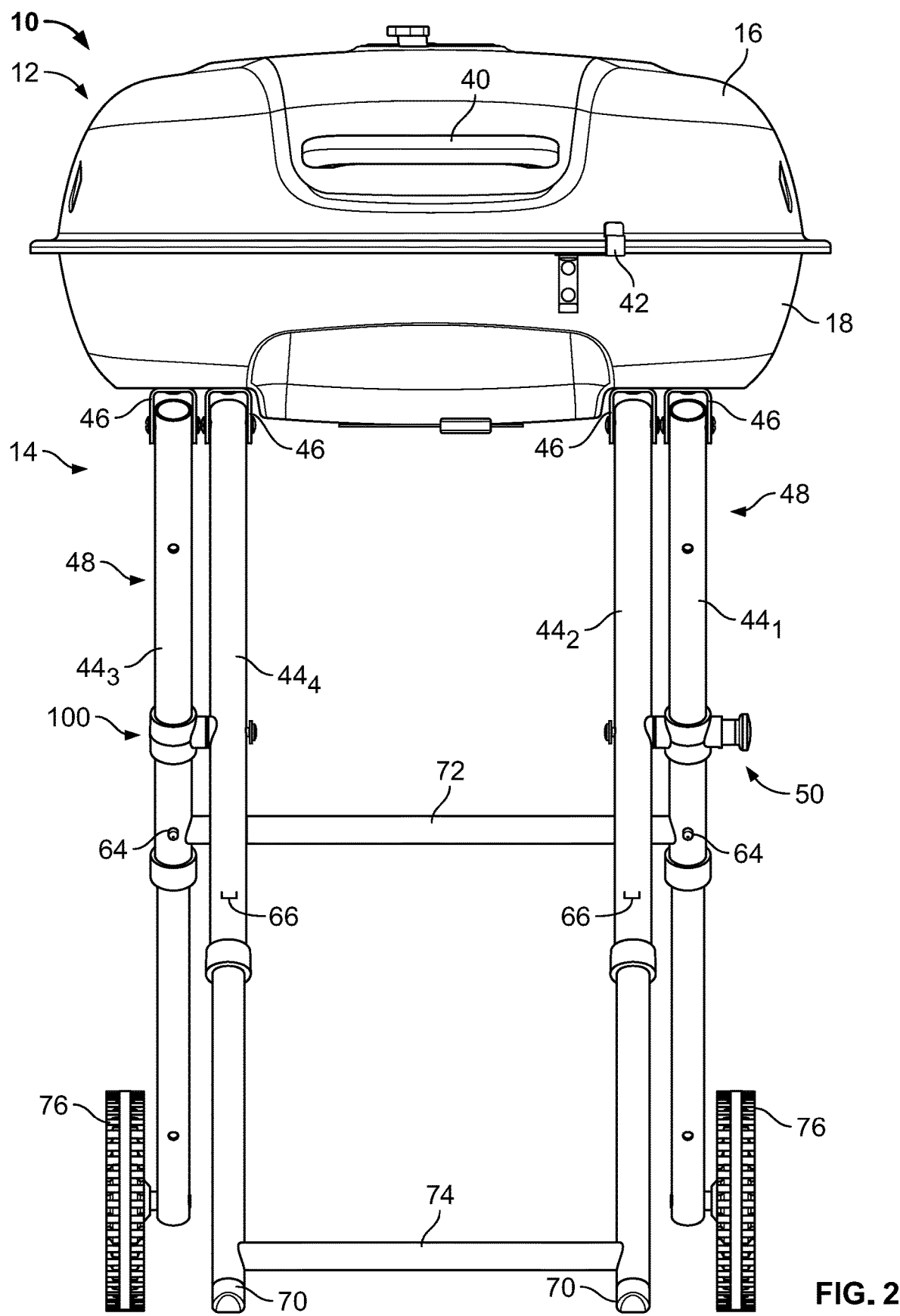
FIG. 2 is a front elevational view of the example grill of FIG. 1, in the example expanded configuration.
Figure 3:
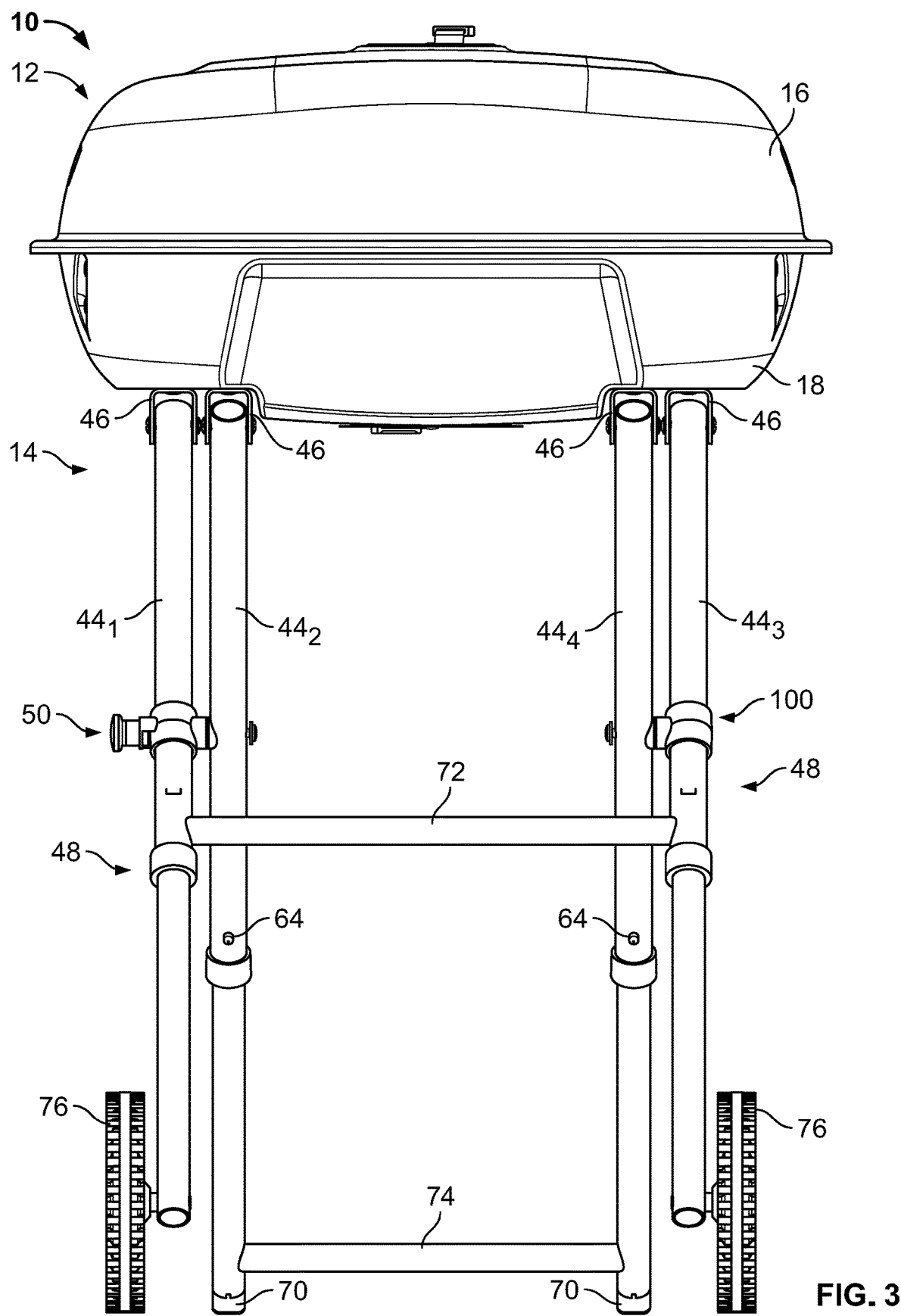
FIG. 3 is a rear elevational view of the example grill of FIG. 1, in the example expanded configuration.
Figure 4:
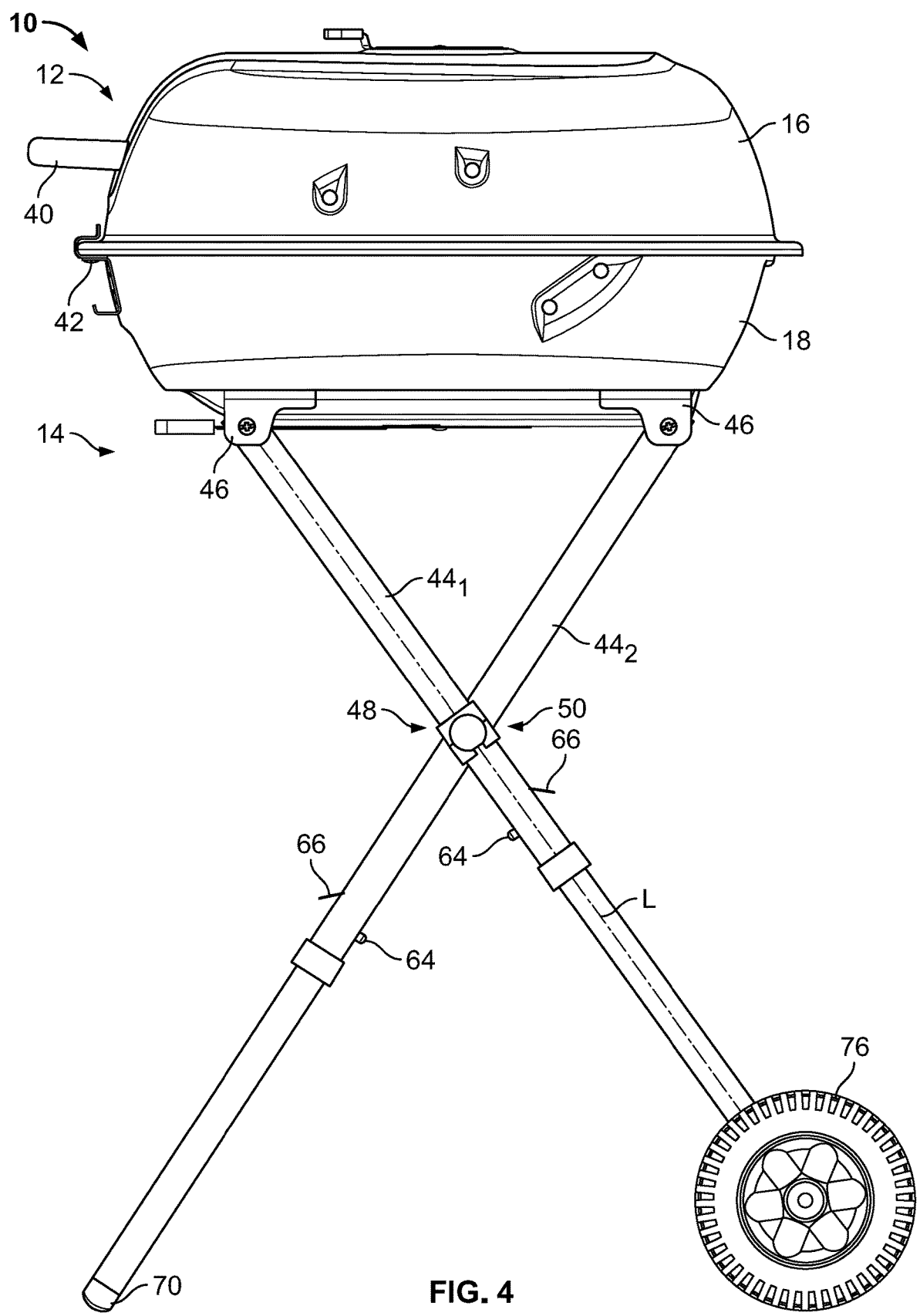
FIG. 4 is a left-side elevational view of the example grill of FIG. 1, in the example expanded configuration.
Figure 5:
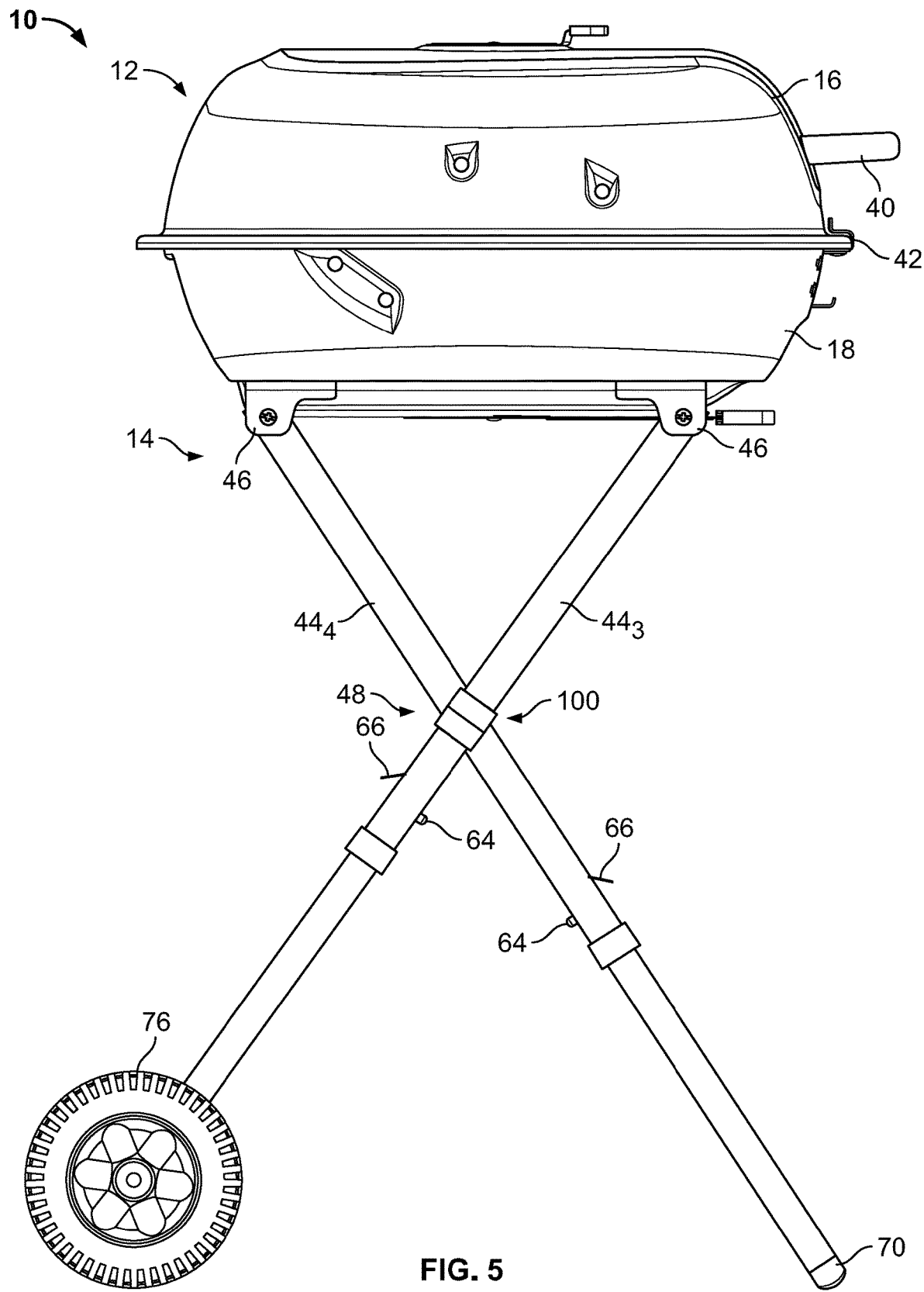
FIG. 5 is a right-side elevational view of the example grill of FIG. 1, in the example expanded configuration.
Figure 6:
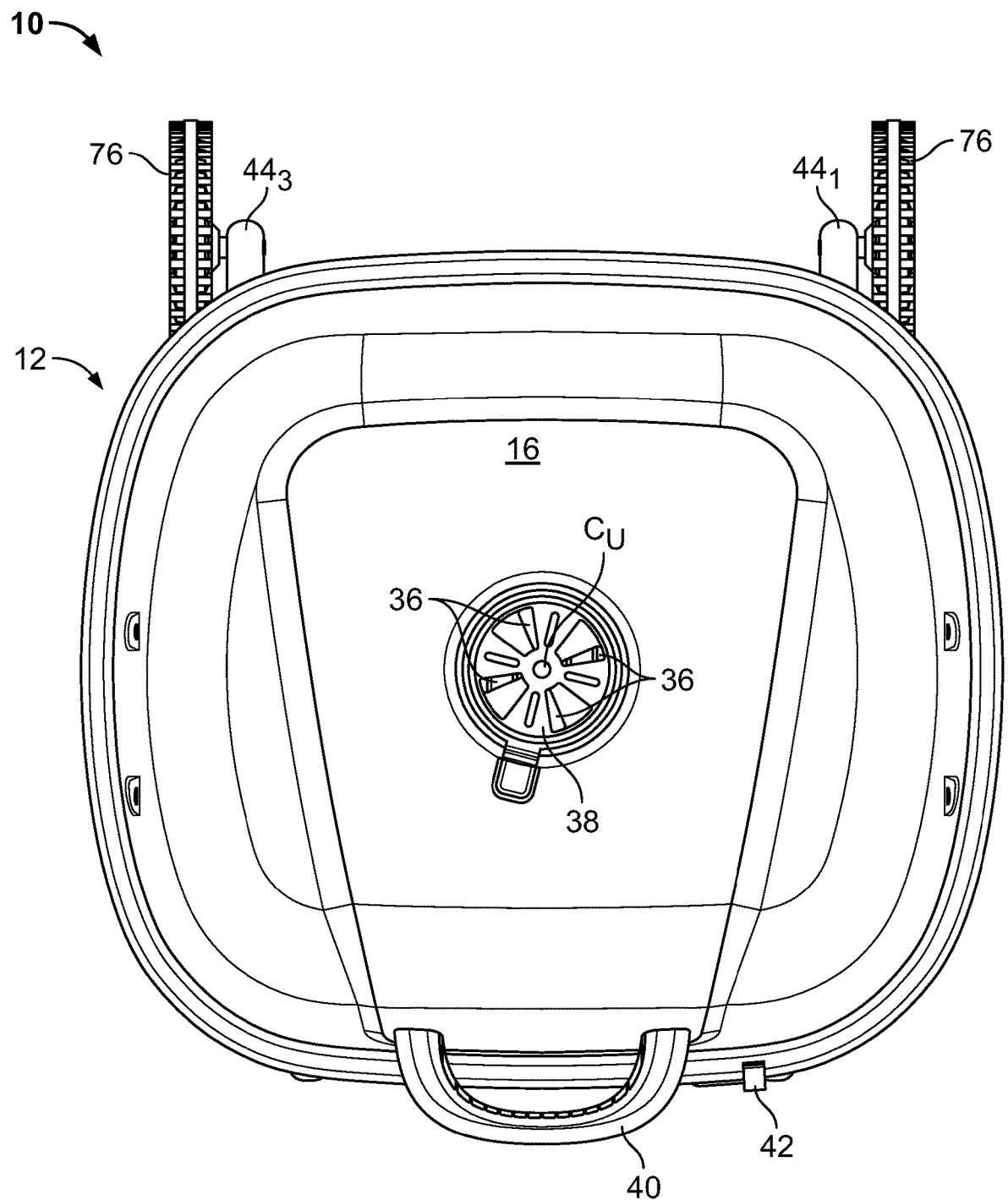
FIG. 6 is a top elevational view of the example grill of FIG. 1, in the example expanded configuration.

Referring to the drawings, wherein like numerals refer to the same or similar features in the various views, FIGS. 1-7 are various views of an example grill 10 in an expanded, standing position, FIGS. 8-14 are various views of the example grill 10 in a collapsed position. Referring to FIGS. 1-14, the grill 10 may include a body 12 defining a grill chamber and a support assembly 14.

The body 12 of the grill may include a lid 16 and a basin 18. The basin 18 may be configured to receive and/or store a heat source (e.g., charcoal or wood) and maintain the heat source under a rack or other component configured to receive a food item to be cooked on the grill 10. The lid 16 may be configured to cover the top of the basin 18 so as to enclose a chamber 20 (see FIG. 15) for cooking food items, the chamber 20 defined by the body 12.

Figure 14:
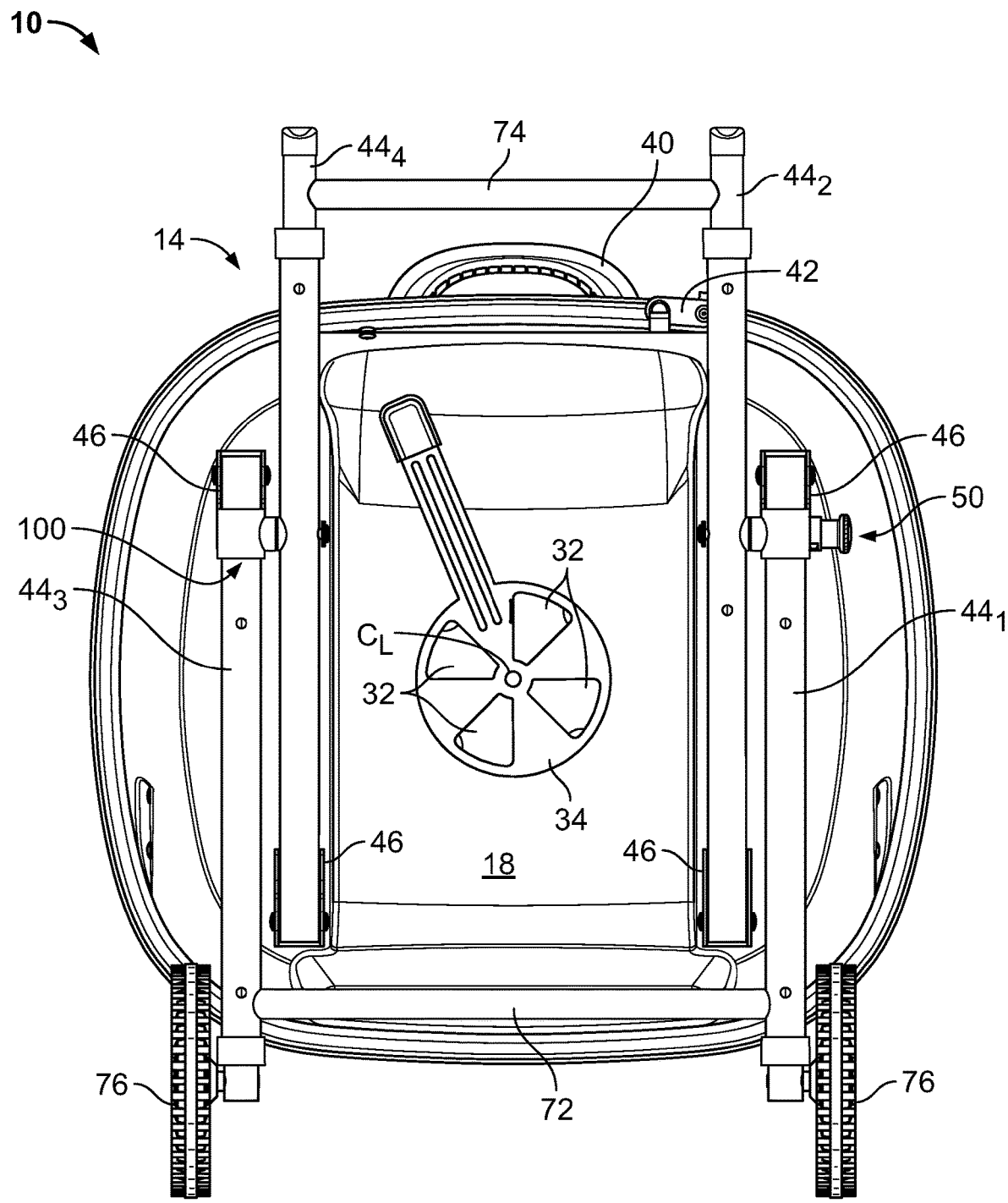
FIG. 14 is a bottom elevational view of the example grill of FIG. 1, in the example collapsed configuration.
Figure 15:
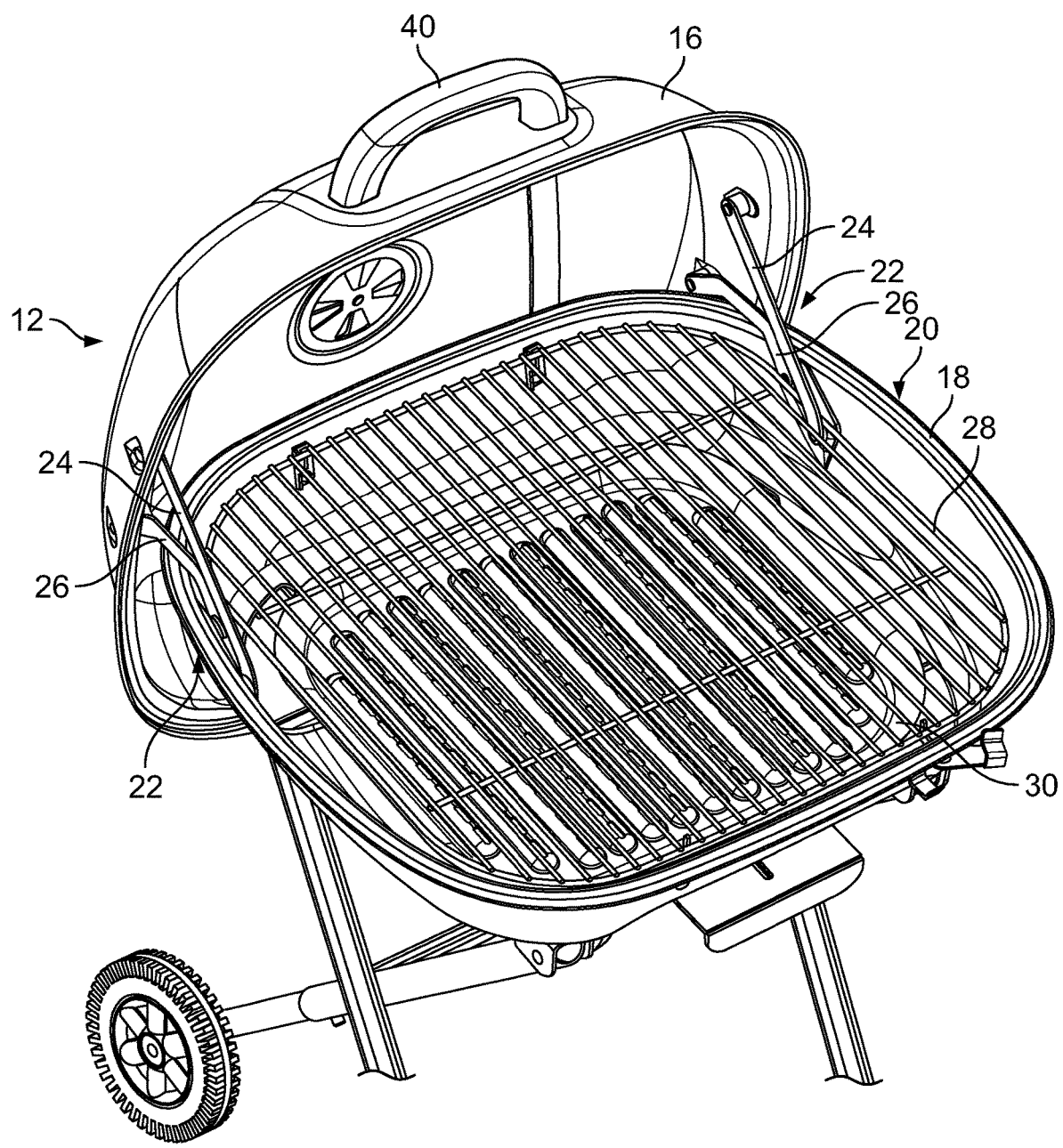
FIG. 15 is a perspective view of a portion of the example grill of FIG. 1.

Referring to FIG. 15, which is a perspective view of an example of the grill 10 with the lid 16 open, the grill body 12 may include two link assemblies 22, with each link assembly 22 including an upper arm 24 and a lower arm 26. A respective first end of each arm 24, 26 may be coupled to the lid 16, and a respective second end of each arm 24, 26 may be coupled to the basin 18. Accordingly, the link assemblies 22 may couple the lid 16 to the basin 18. The link assemblies 22 may be disposed in an inner side of the lid 16 and of the basin 18, such that the arms 24, 26 are disposed within the grill body 12 when the lid 16 is closed. Both the lid 16 and the basin 18 may rotate with respect to the arms 24, 26 at the respective points at which the arms 24, 26 are coupled to the lid 16 and basin 18, such that the lid 16 may be moved between a first position in which the lid 16 covers the basin 18 (as illustrated in FIGS. 1-14) and a second position in which the lid 16 does not cover the basin 18, but remains coupled to the basin (as illustrated in FIG. 15).

For each link assembly 22, the lower arm 26 may be curved, and the upper arm 24 may be straight, such that the arms 24, 26 become closer to each other as the lid 16 is moved from its closed position to its open position, and the arms 24, 26 may contact each other and prevent further opening once the lid 16 is moved to the open position, as shown in FIG. 15.

The grill body 12 may further include a rack 28 that is removably coupled with the basin 18 and a tray 30 that is removably coupled with the basin 18. The rack 28 may be coupled to the basin 18 so as to support one or more food items to be cooked over a heat source supported by the tray 30.

Figure 7:
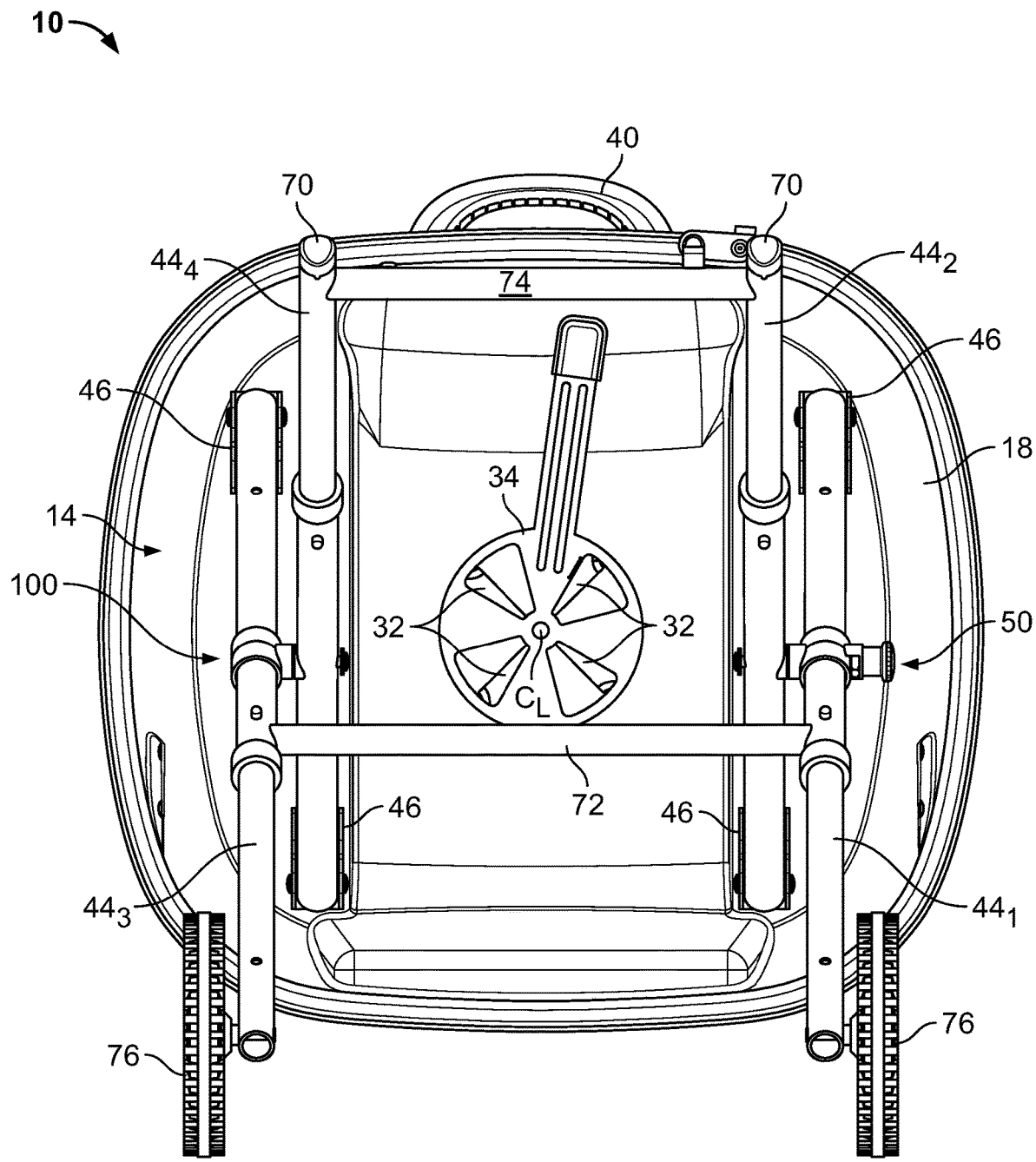
FIG. 7 is a bottom elevational view of the example grill of FIG. 1, in the example expanded configuration.
Figure 8:
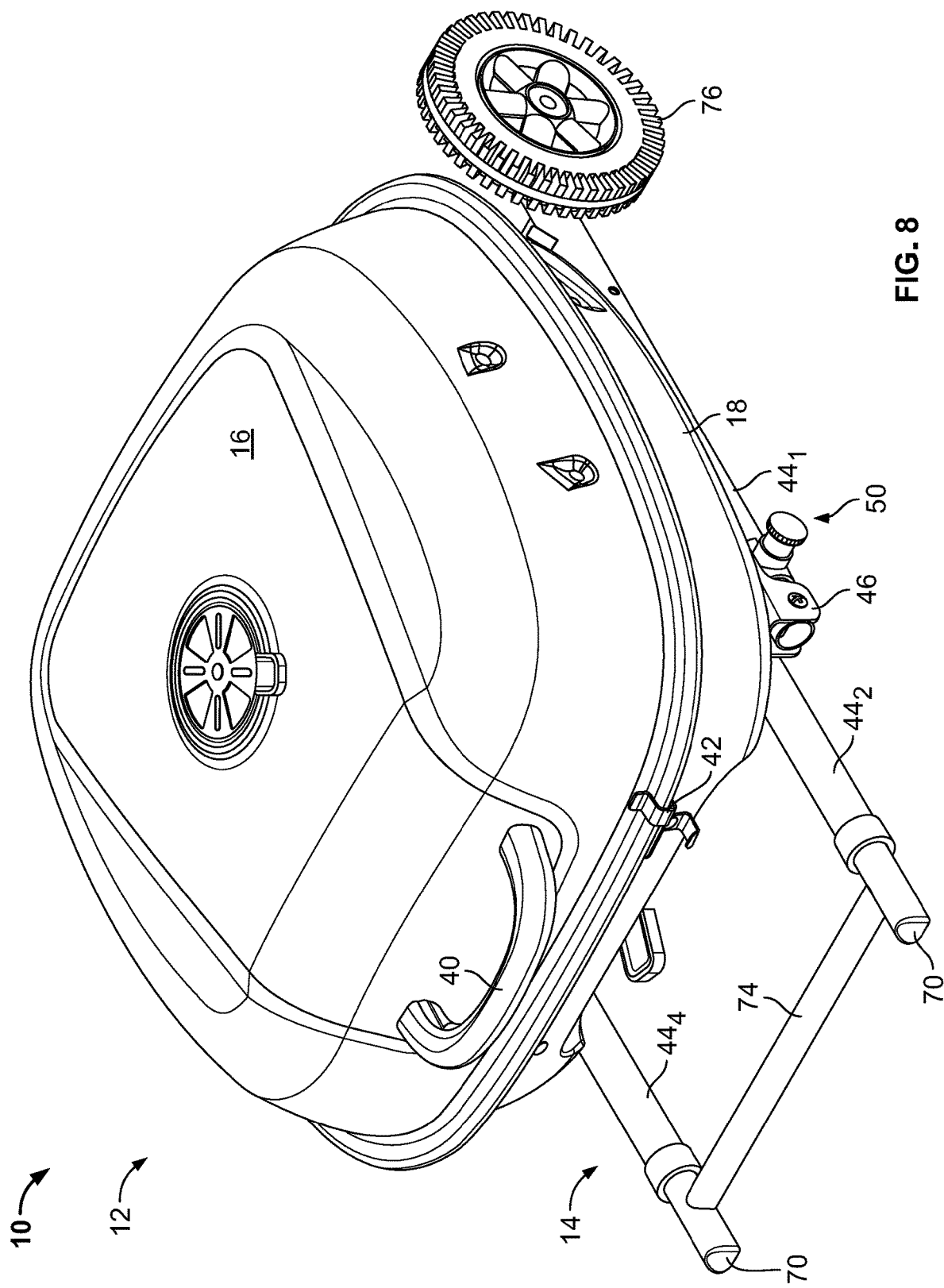
FIG. 8 is a perspective view of the example grill of FIG. 1, in an example collapsed configuration.
Figure 9:
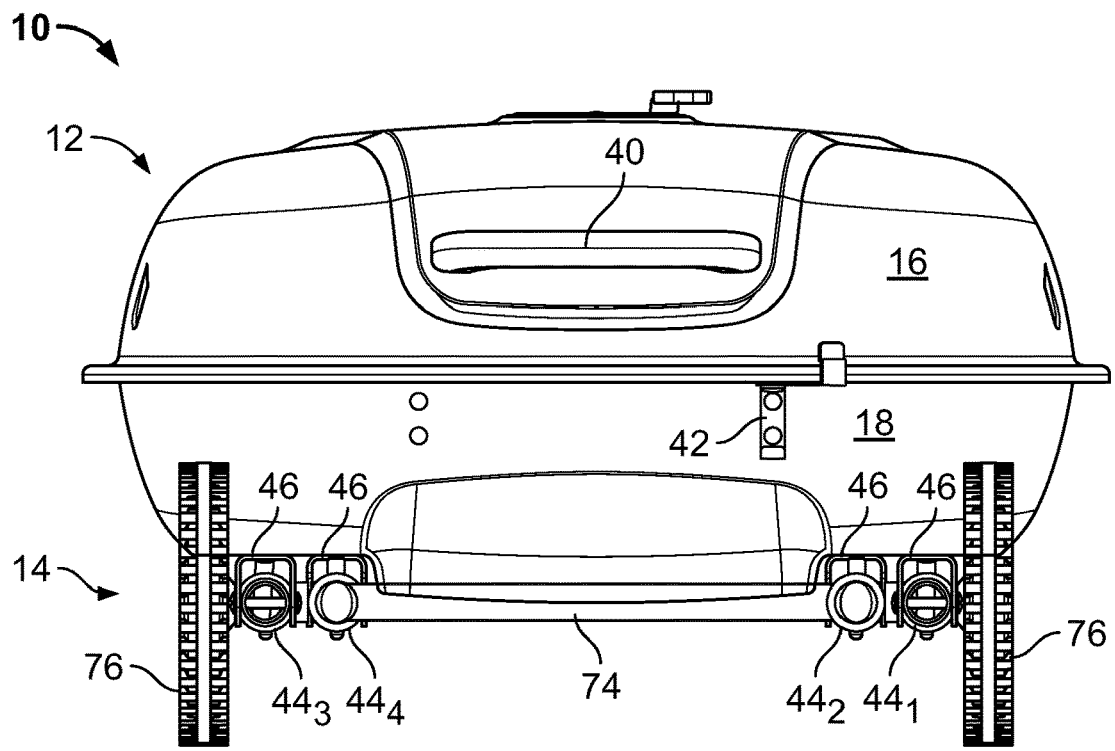
FIG. 9 is a front elevational view of the example grill of FIG. 1, in the example collapsed configuration.
Figure 10:
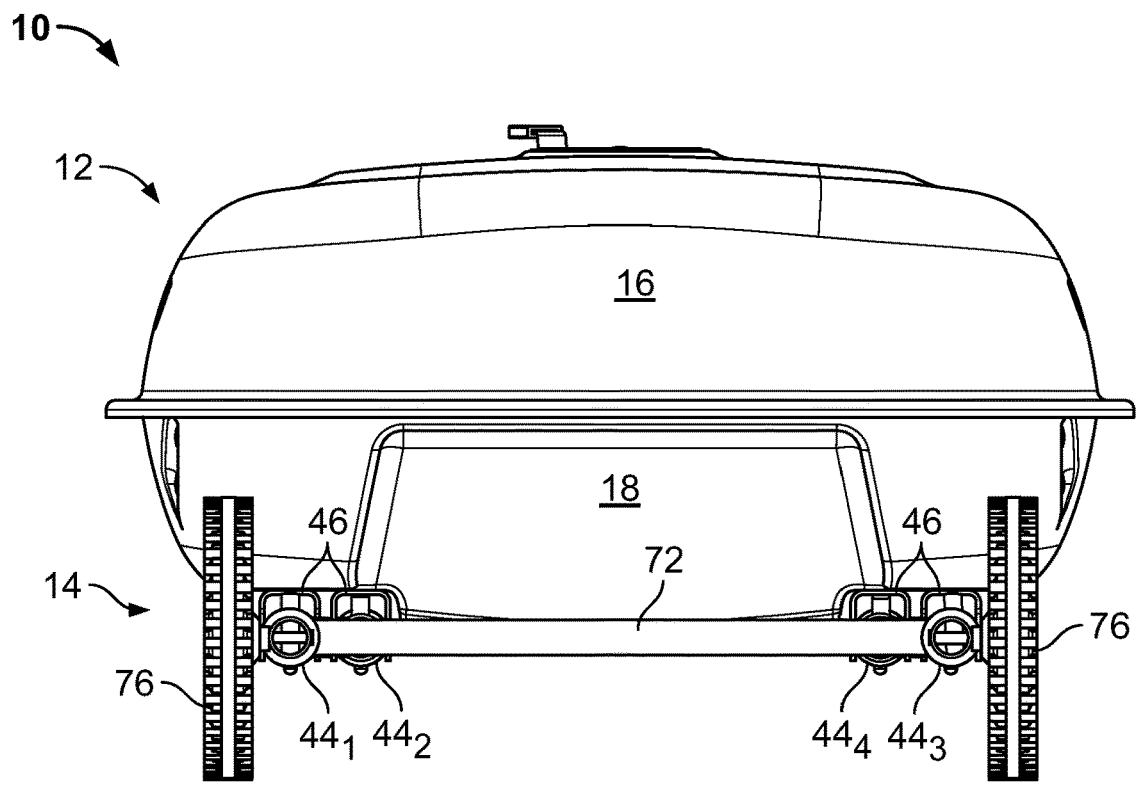
FIG. 10 is a rear elevational view of the example grill of FIG. 1, in the example collapsed configuration.
Figure 11:
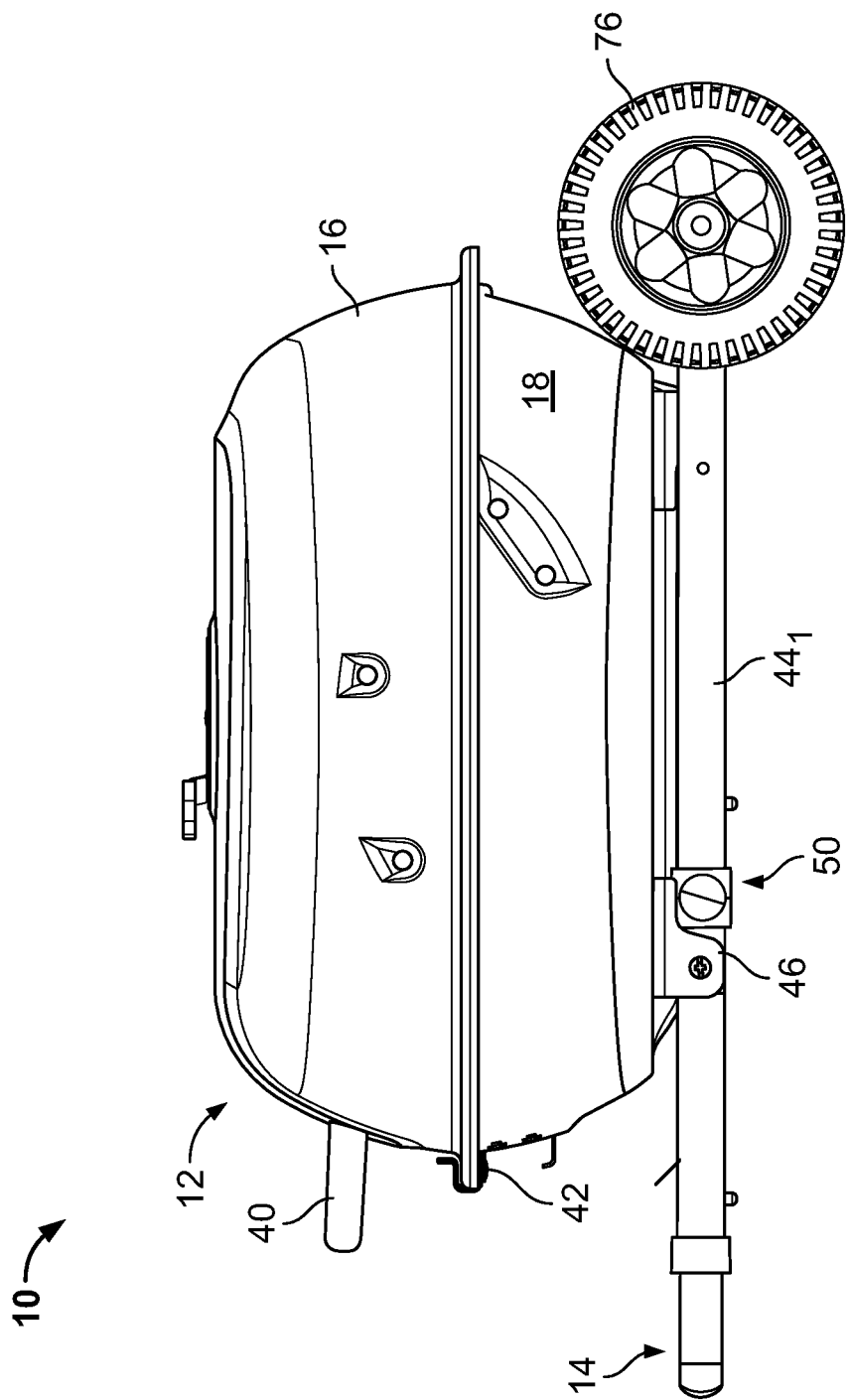
FIG. 11 is a left-side elevational view of the example grill of FIG. 1, in the example collapsed configuration.
Figure 12:
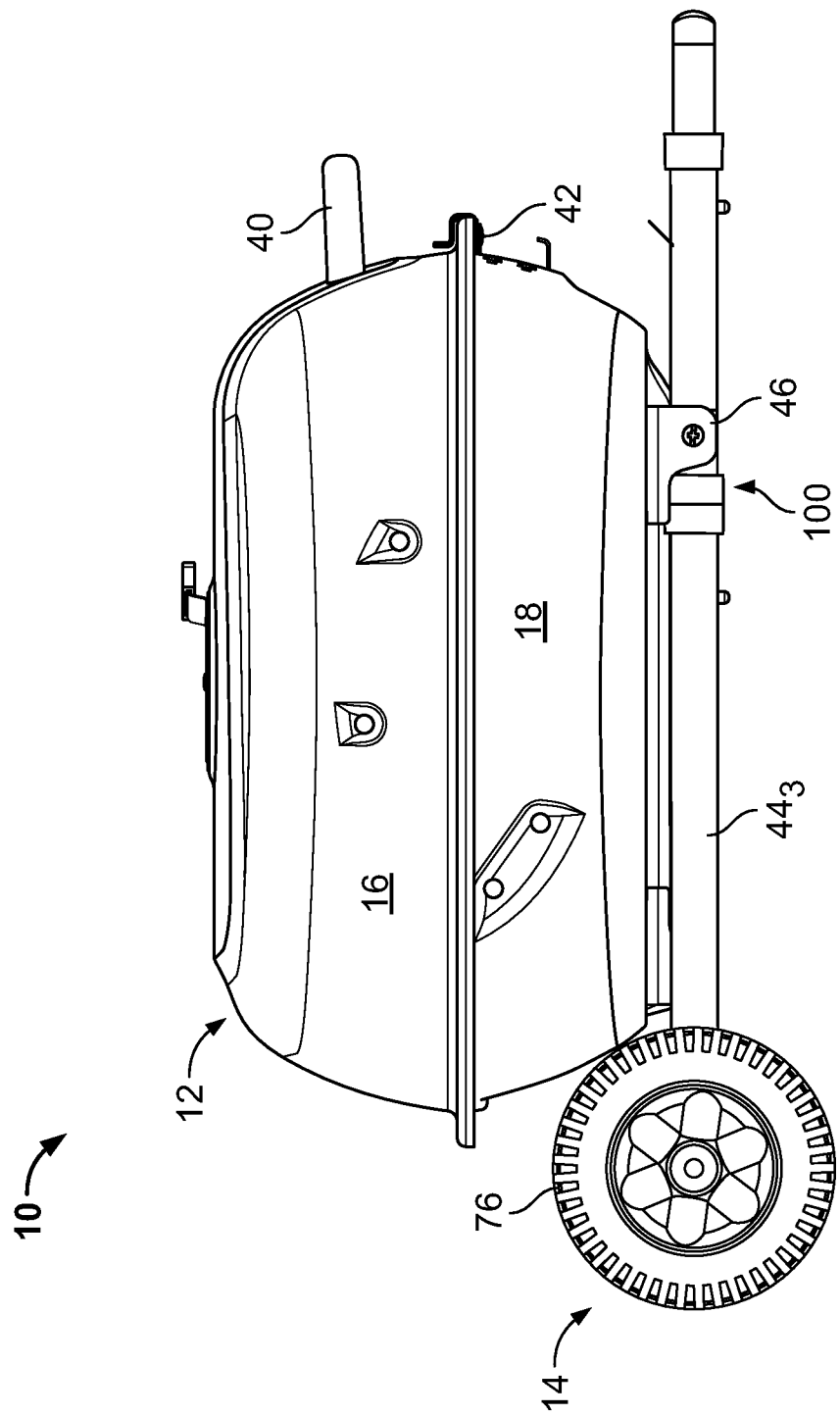
FIG. 12 is a right-side elevational view of the example grill of FIG. 1, in the example collapsed configuration.
Figure 13:
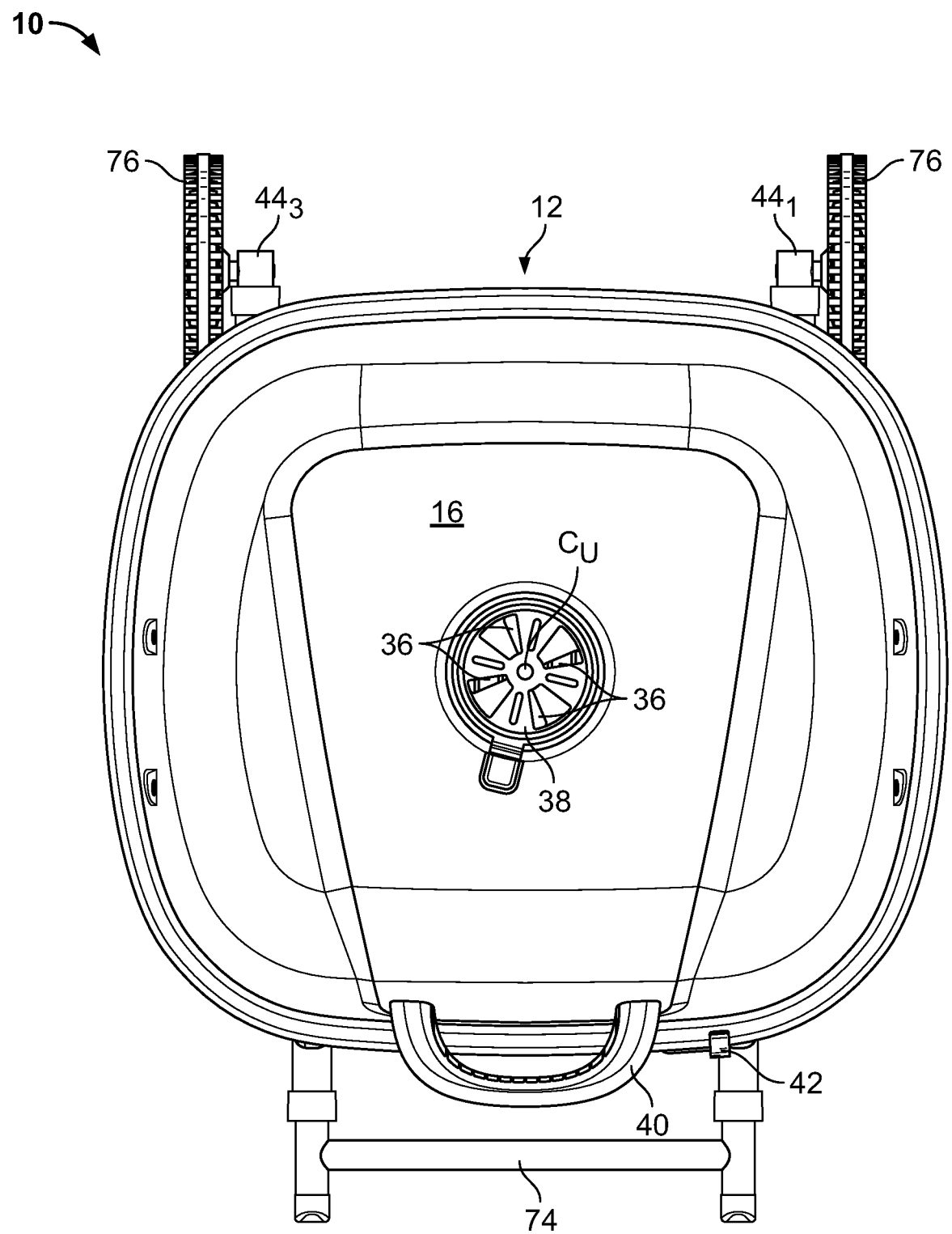
FIG. 13 is a top elevational view of the example grill of FIG. 1, in the example collapsed configuration.

As best shown in FIGS. 7 and 14, the basin 18 may define a plurality of lower airflow apertures 32 in a bottom surface of the basin 18. The lower airflow apertures 32 may be radially disposed about a lower center point $C_L$. The grill body 12 may include a lower aperture cover 34 that includes a plurality of apertures and a plurality of covering portions. The lower aperture cover 34 may rotate relative to the lower center point $C_L$, such that the plurality of apertures of the lower aperture cover 34 may align with the lower airflow apertures 32 so as to permit airflow into the basin 18 in one rotational position of the lower aperture cover 34, and the plurality of covering portions of the lower aperture cover 34 may align with the lower airflow apertures 32 so as to prevent airflow into the basin 18 in another rotational position of the lower aperture cover 34.

The lid 16 may define a plurality of upper airflow apertures 36 on an upper surface of the lid 16. The upper airflow apertures 36 may be radially disposed about an upper center point $C_U$. The grill body 12 may include an upper aperture cover 38 that includes a plurality of apertures and a plurality of covering portions. The upper aperture cover 38 may rotate relative to the upper center point $C_U$, such that the plurality of apertures of the upper aperture cover 38 may align with the upper airflow apertures 36 so as to permit airflow into the body 12 in one rotational position of the upper aperture cover 38, and the plurality of covering portions of the upper aperture cover 38 may align with the upper airflow apertures 36 so as to prevent airflow into the body 12 in another rotational position of the upper aperture cover 38.

The grill body 12 may also include a lid handle 40 disposed on an outer surface of the lid 16 for moving the lid 16 between open and closed positions. In an embodiment, the lid handle 40 may be disposed on a front outer surface of the lid 16.

The grill body 12 may also include one or more features for securing the lid 16 to the basin 18 (e.g., during transportation of the grill 12). For example, in some embodiments, the grill body 12 may include a retainer clip 42 coupled to the basin 18, which retainer clip 42 may receive the lid 16 to secure the lid 16 in a closed position, as illustrated in FIGS. 1-14.

The support assembly 14 may include a plurality of legs $44_1$, $44_2$, $44_3$, $44_4$ and may be configured to support the grill body 12 during operation of the grill 10 and/or during transportation of the grill 10. The support assembly 14 may be configured to fold and collapse, and thus may have at least two positions. In some embodiments, a first position of the support assembly 14 may be an expanded, standing, upright position, illustrated in FIGS. 1-7. In some embodiments, a second position of the support assembly 14 may be a collapsed position, illustrated in FIGS. 8-14. The expanded position may find use during operation of the grill 10, and the collapsed position may find use during transportation of the grill 10, in some embodiments.

Each of the legs 44 may include respective upper ends, which may be closest to the basin 18 when the support assembly 14 is in its upright position, and respective lower ends, which are farthest from the basin 18 when the support assembly 14 is in its upright position. Each leg 44 may define its own longitudinal axis L (illustrated with respect to the first leg $44_1$ in FIG. 4) that extends from the upper end to the lower end. Each leg upper end may be coupled to the body 12 of the grill 10. For example, in the embodiment illustrated, each leg upper end is coupled to a bottom surface of the basin 18 of the body 12. As shown in FIGS. 1-14, each leg upper end may be indirectly coupled to the body 12 through a respective bracket 46. Accordingly, four brackets 46 may be directly coupled to the bottom surface of the basin 18, and the upper ends of the four legs $44_1$, $44_2$ $44_3$, $44_4$ may be coupled to respective brackets 46. The brackets 46 may be rigidly coupled to the basin 18 so as to remain in a static position with respect to the basin 18. In some embodiments, the upper ends of the four legs $44_1$, $44_2$ $44_3$, $44_4$ may be respectively rotatably coupled to the brackets 46, such that the legs $44_1$, $44_2$ $44_3$, $44_4$ may rotate with respect to their respective brackets 46 and with respect to the grill basin 18 so as to move the support assembly 14 between collapsed and expanded positions.

In an embodiment, the support assembly 14 may include two leg subassemblies 48 that collectively include the four legs $44_1$, $44_2$ $44_3$, $44_4$. A first leg subassembly 48 may include the first leg $44_1$ and the second leg $44_2$ and may be disposed on a left side of the grill 10, in some embodiments. A second leg subassembly 48 may include the third leg $44_3$ and the fourth leg $44_4$ and may be disposed on a right side of the grill 10, in some embodiments.

As noted above, the first leg subassembly 48 may include the first leg $44_1$ and the second leg $44_2$. The first leg subassembly 48 may further include a first pin-collar assembly 50 configured to couple the first leg $44_1$ to the second leg $44_2$ in a slidable and lockable connection. For example, as will be described below, the first leg $44_1$ may be slidably coupled with the first pin collar assembly 50 and the second leg $44_2$ may be rotatably coupled with the first pin collar assembly 50.

Figure 16:
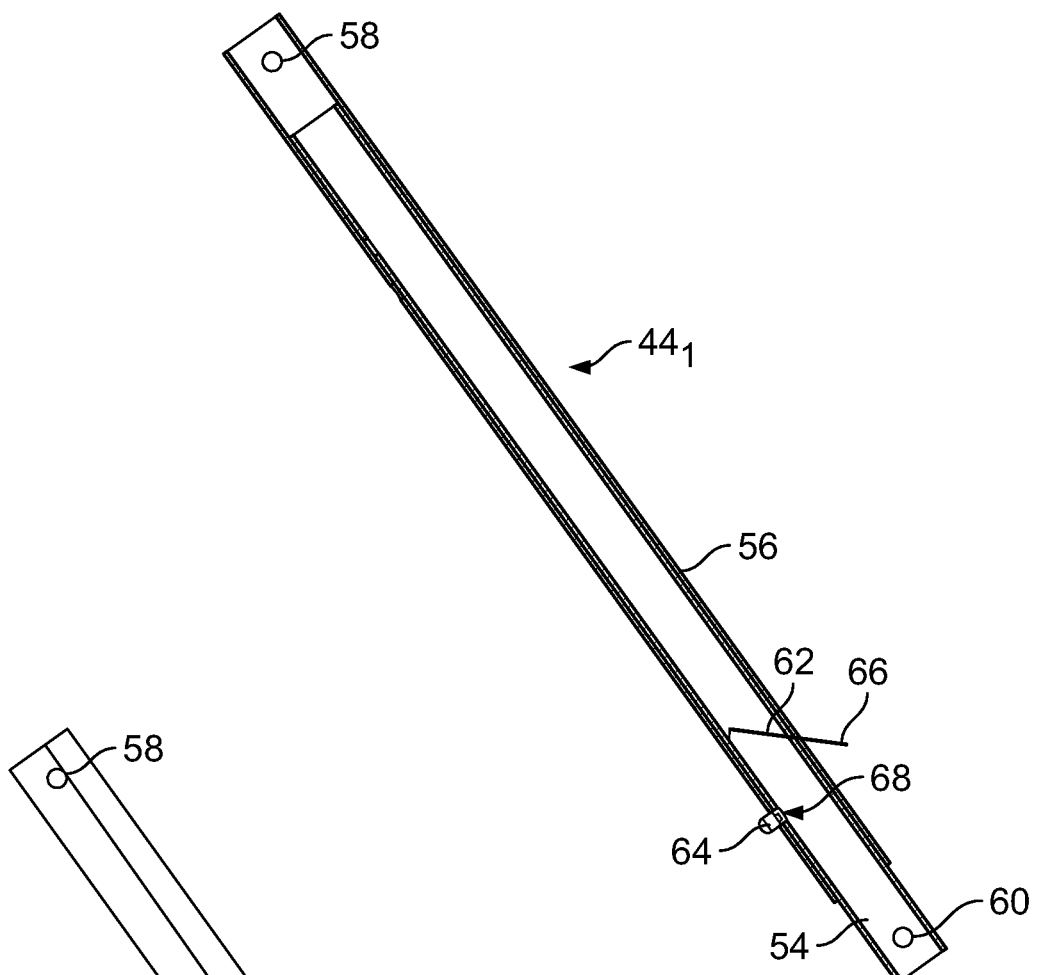
FIG. 16 is a cross-sectional view of a portion of an example first leg of the example grill of FIG. 1.
Figure 17:
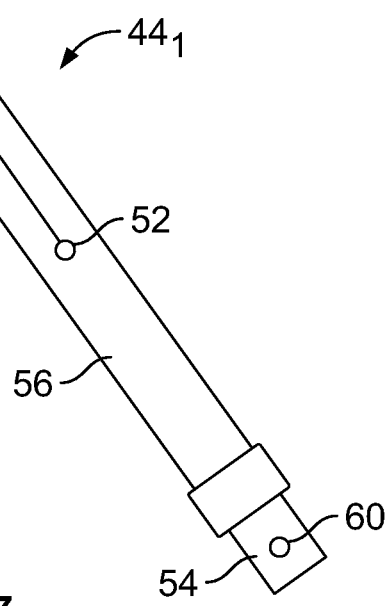
FIG. 17 is a perspective view of a portion of an example first leg of the example grill of FIG. 1.

FIG. 16 is a cross-sectional view of a portion of the first leg $44_1$, and FIG. 17 is a perspective view of the same portion of the first leg $44_1$, where the cross-section of FIG. 16 is taken parallel to the plane of the page of FIG. 16. The first leg $44_1$ may define one or more retaining apertures 52 for receiving a spring-pin of the pin-collar assembly 50 to secure the first leg subassembly 48 in a desired position (and, in some embodiments, to secure both leg subassemblies 48 in a desired position). For example, in the illustrated embodiment, the first leg $44_1$ may define a single retaining aperture 52 for retaining a spring pin of the pin collar assembly 50 For example, in some embodiments, the first leg $44_1$ may define a retaining aperture 52 at a midpoint of the leg $44_1$. In other embodiments, the first leg $44_1$ may additionally define an upper retaining aperture, adjacent to the aperture 58 for coupling to the bracket 46 at the upper end of the first leg $44_1$. In some embodiments, the one or more pin retaining apertures 52 may be substantially transverse to the longitudinal axis L defined by the first leg $44_1$. The first leg $44_1$ may further include an aperture 60 at a lower end of the leg $44_1$ for coupling with the hub pf a wheel, as will be described below.

The first leg $44_1$ may include an inner portion 54 and an outer portion 56, and the inner portion 54 may be longitudinally movable relative to the outer portion 56. The inner and outer portions 54, 56 may be or may include hollow cylinders, in some embodiments. Accordingly, the first leg $44_1$ may telescope between two or more different lengths. For example, the first leg $44_1$ may telescope to a first, extended position for operative use of the grill 10 and a second, collapsed position for transportation of the grill 10.

The first leg $44_1$ may also include a snap button 62 (shown in FIG. 16, but omitted from FIG. 17) configured to secure the inner portion 54 of the first leg $44_1$ in a selected position with respect to the outer portion 56. The snap button 62 may include a button portion 64 and an opposed member 66 The button portion 64 may extend through an aperture in the first leg $44_1$ and may be coupled to the opposed member 66, which may extend through a slot on the opposed side of the first leg $44_1$, such that a user must push both the button 64 and the opposed member 66 into the first leg $44_1$ in order to telescope the inner portion 54 with respect to the outer portion 56. The snap button 62 may be coupled to the inner leg portion 54, and retracting the button 64 and opposed member 66 may permit the inner leg portion 54 to telescope relative to the outer leg portion 56. In contrast, when the button 64 is disposed in a snap button retaining aperture 68 of the outer leg portion 56, the inner leg portion 54 may be locked in position relative to the outer leg portion 56.

The third leg $44_3$ may be substantially the same as the first leg $44_1$, in embodiments. However, in some embodiments, the third leg $44_3$ may not include retaining apertures 52 for engaging a spring pin.

The second and fourth legs $44_2$, $44_4$ may be substantially the same as the third leg, in some embodiments. However, the second and fourth legs $44_2$, $44_4$ may not include apertures 60 for coupling a wheel, and instead may include end caps 70 configured to interface with the ground when the grill 10 is in use.

The support assembly 14 may further include a first cross-member 72 that extends from the first leg $44_1$ to the third leg $44_3$ and a second cross-member 74 that extends from the second leg $44_2$ to the fourth leg $44_4$. The first cross-member 72 may be coupled to the outer portions 56 of the first and third legs $44_1$, $44_3$, in some embodiments. The second cross-member 74 may be coupled to the inner portions 54 of the second and fourth legs $44_2$, $44_4$, in some embodiments.

The support assembly 14 may further include two wheels 76 respectively coupled to the first and third legs $44_1$, $44_3$, in embodiments. The wheels 76 may be coupled to the legs $44_1$, $44_3$ via respective hubs about which the wheels may rotate.

Figure 18:
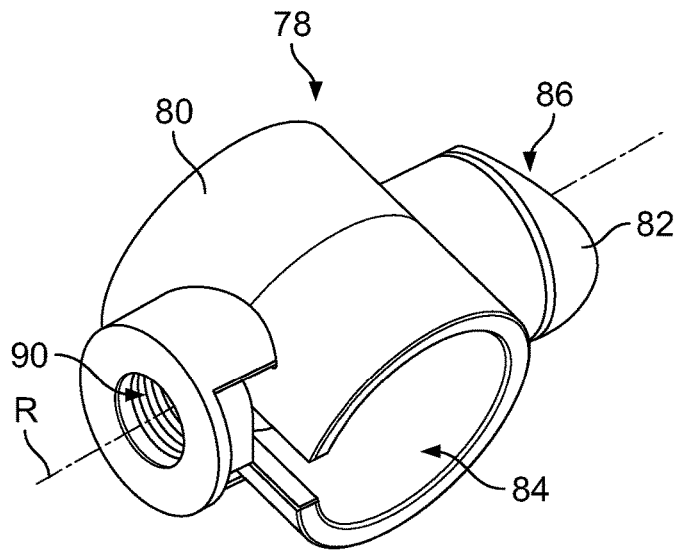
FIG. 18 is a perspective view of an example pin-collar housing of the example grill of FIG. 1.
Figure 19:
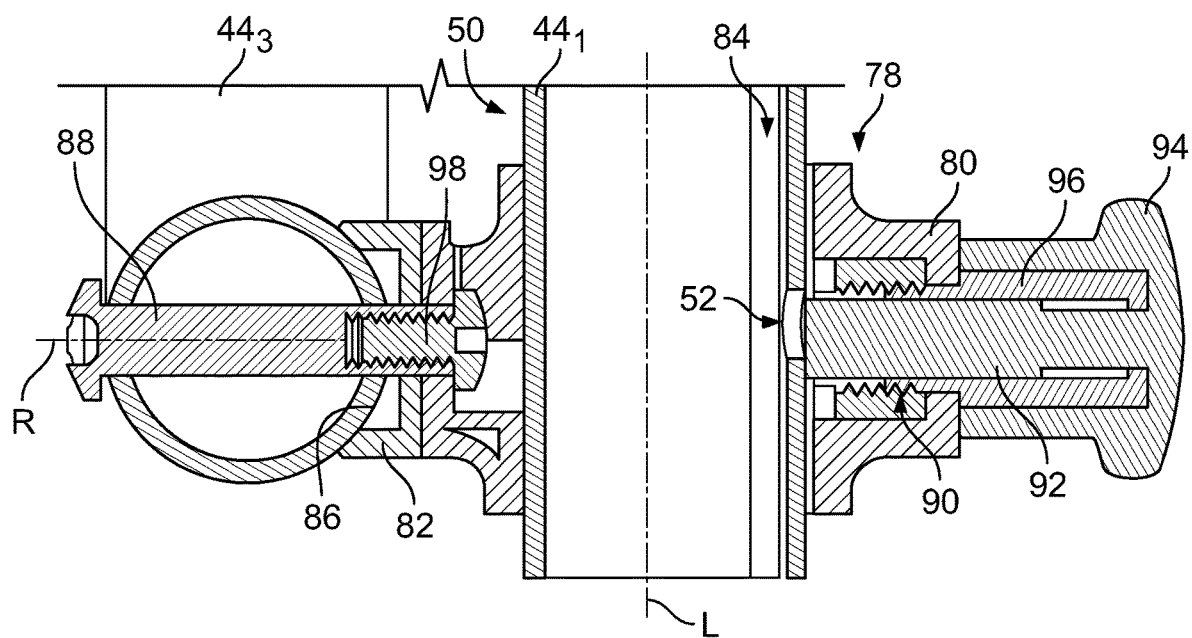
FIG. 19 is a cross-sectional view of an example pin-collar assembly.

FIG. 18 is an isometric view of an example housing 78 of the first pin collar assembly 50, and FIG. 19 is a cross-sectional view of the first pin collar assembly 50 along with the first and second legs $44_1$, $44_2$. In some embodiments, the housing 78 may include two portions, a first portion 80 and a second portion 82. The first portion 80 may define a longitudinal aperture 84 for receiving the first leg $44_1$, and the second portion 82 may be coupled with the second leg $44_2$. The longitudinal aperture 84 of the first portion 80 may have substantially the same shape as the first leg $44_1$, respectively. Accordingly, in the embodiment illustrated, the first portion 80 defines a cylindrical longitudinal aperture 84, and the first leg $44_1$ is generally cylindrical. In other embodiments, however, the first leg $44_1$ may have a different shape, and the first portion 80 of the housing 78 may define a longitudinal aperture shape that is different than a cylinder. The longitudinal aperture 84 may be configured to permit the first leg $44_1$ to move longitudinally relative to the housing 78 between the standing and collapsed configurations. In contrast, the housing 78 may maintain the same longitudinal position with respect to the length of the second leg $44_2$ in the standing locked configuration and in the collapsed configuration.

The second portion 82 may include a receiving portion 86 that may abut the second leg $44_2$, and the second portion 82 may be coupled to the second leg $44_2$ via a fastener, such as a screw, bolt, or threaded pin, in some embodiments. The second portion 82 may thus be rigidly coupled with the second leg $44_2$.

The first and second portions 80, 82 of the housing 78 may be rotatable with respect to one another, in some embodiments. As a result, the first and second legs $44_1$, $44_2$ may be rotatable with respect to one another. The first and second portions 80, 82 may be coupled together by a pin 88, about which one or both portions may rotate. The pin 88 may be transverse to the longitudinal aperture 84 of the first housing portion, in an embodiment. Accordingly, the bolt may define a pin collar rotation axis R about which the housing 78 may rotate. The pin collar rotation axis R may be substantially parallel to the pin retention aperture 52 of the first leg $44_1$, in embodiments, and substantially transverse to the longitudinal aperture 84 of the housing, in embodiments (and therefore substantially transverse to the longitudinal axis L of the first leg $44_1$).

The first housing portion 80 may define a transverse aperture 90 for receiving a spring-pin 92. The transverse aperture 90 may be substantially perpendicular to the longitudinal aperture 84 of the first portion 80, in some embodiments. The transverse aperture 90 may extend from an outer surface of the first portion 80 to an inner surface of the first portion, which inner surface also partially defines the longitudinal aperture 84. Accordingly, the transverse aperture 90 may provide a pathway for the pin 92 from the outer surface of the housing 78 to the first leg $44_1$, when the first leg $44_1$ is disposed in the longitudinal aperture 84, in some embodiments.

The first pin-collar assembly 50 may include the first and second housing portions 80, 82, a spring pin 92 disposed within the first housing portion 80, a handle 94 coupled with the spring pin 92, and a bias spring 96 coupled with the handle 94 and/or spring pin 92. The spring pin 92 may be actuated by pulling the handle 94 away from the longitudinal aperture 84 in a transverse direction, and the spring 96 may bias the spring pin 92 towards contact with the first leg $44_1$ (e.g., the spring 96 may resist movement of the handle 94 away from the longitudinal aperture 84 in a transverse direction). That is, the handle 94 may be coupled to the spring pin 92, whereby actuation of the handle 94 causes retraction and extension of the spring pin 92. FIG. 19 illustrates the spring pin 92 longitudinally offset from a retaining aperture 52 of the first leg $44_1$. When the spring pin 92 is longitudinally aligned with such a retaining aperture 52, the spring pin 92 may be biased into the retaining aperture 52 by the spring 96 and received by the retaining aperture 52 so as to secure the first pin-collar assembly 50 in a fixed longitudinal position of the first leg $44_1$. In some embodiments, the spring pin 92 may be retained in the retaining aperture 52 of the first leg $44_1$ when the grill is in a standing locked configuration.

The second housing portion 82 may be coupled to the second leg $44_2$ via a fastener, such as the illustrated bolt assembly, which may extend through transverse apertures in the second leg so as to secure the first pin-collar assembly 50 to the second leg $44_2$. The bolt 88 may further extend into the first housing portion 80. The first housing portion 80 may rotate relative to the second housing portion 82 about the bolt 88. A fastener 98 may secure the first housing portion 80 to the bolt 88.

The support assembly 14 may further include a second pin collar assembly 100 that couples the third leg $44_3$ to the fourth leg $44_4$. The second pin collar assembly 100 may be substantially the same as the first pin collar assembly 50, but may lack the spring pin 92, handle 94, and bias spring 96, in some embodiments. Accordingly, the second pin collar assembly 100 may permit the third leg $44_1$ to move freely longitudinally through the longitudinal aperture 84 of the second pin collar assembly 100. In other embodiments, the second pin collar assembly 100 may be identical to the first pin collar assembly 50, or may otherwise include a spring pin 92, handle 94, and bias spring 96.

The first pin collar assembly 50 is presented as an example only as an example of a collar assembly that may find use with a support assembly 14 according to the instant disclosure. In other embodiments, other collar assemblies may be used. For example, instead of a handle 94 and spring pin 92, a collar assembly may include a latch that increases the diameter of the collar so as to permit movement of a leg and decreases the diameter of the collar so as to secure the leg in position, or a latch that contacts a receiving formation at a point on a leg of the support assembly. Numerous other examples are possible.

Although the instant disclosure describes a support assembly 14 for a grill 10, the support assembly 14 of the present disclosure may find use with devices other than grills, in embodiments.

In operation, a user may use the grill 10 to cook food while the support assembly is in its expanded configuration, which is illustrated in FIGS. 1-7. In the expanded configuration, the pin 92 of the first pin collar assembly 50 may be secured in the pin receiving aperture 52 of the first leg $44_1$, and the second pin collar assembly 100 may similarly be situated at a mid-leg position of the third leg $44_3$. The first and second legs $44_1$, $44_2$ may be secured in the expanded configuration by the first pin collar assembly 50, and the third and fourth legs $44_3$, $44_4$ may be secured in the expanded configuration by the first and second legs $44_1$, $44_2$, respectively, via the cross-members 72, 74. In the expanded configuration, the first leg $44_1$ may cross the second leg $44_2$, and the third leg $44_3$ may cross the fourth leg $44_4$. In the expanded configuration, all four legs $44_1$, $44_2$, $44_3$, $44_4$ may be fully expanded—that is, the respective inner and outer portions 54, 56 of the four legs $44_1$, $44_2$, $44_3$, $44_4$ may be fully telescoped. The legs $44_1$, $44_2$, $44_3$, $44_4$ may be secured in their telescoped positions by respective snap buttons 62 of the four legs $44_1$, $44_2$, $44_3$, $44_4$ being received in respective snap button receiving apertures 68 defined by the four legs $44_1$, $44_2$, $44_3$, $44_4$. The retainer clip 42 of the grill body 12 may be disengaged to permit the lid 16 to be opened.

To collapse the grill 10 (e.g., for storage or transportation), after removing all flammable or hazardous materials from the body 12, the retainer clip 42 of the grill body 12 may be engaged to secure the lid 16 to the basin 18. The grill 10 may be placed on its side or back, and the handle 94 of the first pin collar assembly 50 may be actuated to unseat the pin 92 of the first pin collar assembly 50 from the pin receiving aperture 52 of the first leg $44_1$. The user may then push the first and second pin collar assemblies 50, 100 upward on the first and third legs $44_1$, $44_3$, respectively. As the user pushes the first pin collar assembly 50 upward, the first portion 80 of the housing 78 of the first pin collar assembly 50 may rotate relative to the second portion 82 of the housing 78, and the first leg $44_1$ may therefore rotate relative to the second leg $44_2$. Similarly, as the user pushes the second pin collar assembly 100 upward, the first portion of the housing of the second pin collar assembly 100 may rotate relative to the second portion of the housing of the second pin collar assembly 100, and the third leg $44_3$ may therefore rotate relative to the fourth leg $44_4$. Once the pin 92 of the first pin collar assembly 50 is pushed up to the top of the first leg $44_1$, movement of the first pin collar assembly 50 may be blocked by a bracket 46 (i.e., the first pin collar assembly 50 may abut a bracket 46), at which point the first, second, third, and fourth legs $44_1$, $44_2$, $44_3$, $44_4$ may all be substantially parallel to one another. Each leg $44_1$, $44_2$, $44_3$, $44_4$ may then be collapsed—i.e., the telescoping portions of each leg may be collapsed by depressing the respective snap button 64 and opposed member 66 of each leg $44_1$, $44_2$, $44_3$, $44_4$, and pushing the inner portion 54 of each leg $44_1$, $44_2$, $44_3$, $44_4$ into the outer portion 56 until the snap button 64 of each leg $44_1$, $44_2$, $44_3$, $44_4$ reaches a collapsed snap pin receiving aperture of the leg $44_1$, $44_2$, $44_3$, $44_4$. The grill may then be in the collapsed configuration illustrated in FIGS. 8-14.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details.

What is claimed is:

1. A support assembly for a grill, comprising:
    a rotatable pin collar assembly configured to couple a first leg of the grill to a second leg of the grill in a slidable and lockable connection, the rotatable pin collar assembly comprising:
        a spring pin configured to be retained in a retaining aperture of the first leg at a first longitudinal position on the first leg when the grill is in a standing locked configuration and configured to be positioned at a second longitudinal position on the first leg when the grill is in a collapsed configuration.

2. The support assembly of claim 1, wherein the rotatable pin collar assembly further comprises:
    a housing defining a longitudinal aperture through which the first leg extends and a transverse aperture through which the spring pin extends; and
    a handle, coupled to the spring pin whereby actuation of the handle causes retraction and extension of the spring pin.

3. The support assembly of claim 2, wherein the housing is configured to permit the first leg to move longitudinally through the longitudinal aperture.

4. The support assembly of claim 2, wherein the housing is configured to be rotatably coupled to the second leg.

5. The support assembly of claim 4, wherein the housing is configured to rotate with respect to the second leg about a pin collar rotation axis, the pin collar rotation axis generally parallel with the transverse aperture.

6. The support assembly of claim 4, wherein the housing is configured to have the same longitudinal position with respect to the length of the second leg in the standing locked position and in the collapsed locked position.

7. The support assembly of claim 2, further comprising a bias spring configured to bias the handle towards contact with the first leg.

8. The support assembly of claim 1, further comprising a fastener for coupling the rotatable pin collar assembly with the second leg.

9. The support assembly of claim 1, wherein the rotatable pin collar assembly is a first rotatable pin collar assembly, the support assembly further comprising:
    a second rotatable pin collar assembly configured to attach a third leg of the grill to a fourth leg of the grill in a slidable connection.

10. The support assembly of claim 9, wherein the second rotatable pin collar assembly comprises a housing defining a longitudinal aperture through which the third leg extends, wherein the housing is configured to permit the third leg to move longitudinally through the longitudinal aperture.

11. The support assembly of claim 10, wherein the housing is configured to be rotatably coupled to the fourth leg.

12. The support assembly of claim 10, wherein the housing of the second rotatable pin collar assembly is configured to have the same longitudinal position with respect to the length of the fourth leg in the standing locked position and in the collapsed locked position.

13. The support assembly of claim 9, further comprising a fastener for coupling the second rotatable pin collar assembly with the fourth leg.

14. A support assembly for a grill, comprising:
    a rotatable pin collar assembly configured to couple a first leg of the grill to a second leg of the grill in a slidable and lockable connection, the rotatable pin collar assembly comprising:
        a first housing portion configured to be coupled to the first leg of the grill, via a spring pin, at a first longitudinal position on the first leg when the grill is in a standing locked configuration and at a second longitudinal position on the first leg when the grill is in a collapsed configuration; and
        a second housing portion configured to be coupled to the second leg of the grill, the first housing portion rotatably coupled with the second housing portion.

15. The support assembly of claim 14, wherein the first housing portion defines a longitudinal aperture through which the first leg extends and a transverse aperture through which the spring pin extends.

16. The support assembly of claim 14, further comprising a fastener for coupling the second housing portion to the second leg, wherein the fastener defines an axis of rotation about which the first housing portion rotates with respect to the second housing portion.

17. The support assembly of claim 14, further comprising a handle, configured to be coupled with the first housing portion such that actuation of the handle enables movement of the first housing portion with respect to the first leg when the first housing portion is coupled with the first leg.

18. The support assembly of claim 17, further comprising a bias spring configured to bias the handle towards contact with the first leg.

19. A support assembly for a grill, comprising:
    a rotatable pin collar assembly configured to couple a first leg of the grill to a second leg of the grill in a slidable and lockable connection, the rotatable pin collar assembly comprising:
        a housing defining a longitudinal aperture configured to receive the first leg and a transverse aperture;
        a spring pin configured to extend through the transverse aperture; and a handle, coupled to the spring pin, whereby actuation of the handle causes retraction and extension of the spring pin.

20. The support assembly of claim 19, further comprising a bias spring configured to bias the handle towards contact with the first leg.

* * * * *